United States Patent [19]

Belart et al.

[11] 4,440,454

[45] Apr. 3, 1984

[54] PRESSURE CONTROL ARRANGEMENT FOR VEHICLE BRAKING SYSTEM WITH ANTISKID CONTROL EQUIPMENT

[75] Inventors: Juan Belart, Walldorf; Jochen Burgdorf, Neugasse; Dieter Kircher, Frankfurt am Main; Lutz Weise, Mainz, all of Fed. Rep. of Germany

[73] Assignee: ITT Industries, Inc., New York, N.Y.

[21] Appl. No.: 316,012

[22] Filed: Oct. 28, 1981

[30] Foreign Application Priority Data

Oct. 28, 1980 [DE] Fed. Rep. of Germany ....... 3040540

[51] Int. Cl.$^3$ .............................................. B60T 8/02
[52] U.S. Cl. .................................. 303/114; 188/345; 303/119
[58] Field of Search ................. 303/113, 114, 50, 115, 303/116, 52, 117, 119, 61–63, 68–69, 10–12, 92, 6 R; 188/345, 181 A, 181 R, 352; 60/548, 581, 582

[56] References Cited

U.S. PATENT DOCUMENTS

| | | | |
|---|---|---|---|
| 3,645,584 | 2/1972 | Leiber et al. | 303/119 X |
| 3,999,808 | 12/1976 | Belart | 303/116 X |
| 4,340,257 | 7/1982 | Belart | 188/345 X |
| 4,354,714 | 10/1982 | Belart | 303/114 |
| 4,362,339 | 12/1982 | Belart | 303/113 X |

*Primary Examiner*—Douglas C. Butler
*Attorney, Agent, or Firm*—James B. Raden; Marvin M. Chaban

[57] ABSTRACT

An antiskid control arrangement of a hydraulic vehicle braking system includes a master cylinder device and a throttling valve device arranged between the master cylinder device and the brake pedal. The throttling valve device is incorporated in a circulating circuit which includes a hydraulic pump operated exclusively during antiskid control operation. During normal braking operation without antiskid control action, the braking system operates in a static manner. During antiskid control braking operation, the drive of the hydraulic pump is energized while the throttling valve device remains closed until the dynamic pressure generated by the hydraulic pump has risen to the level to the static pressure then prevailing in the working compartments of the master cylinder device. Thereafter, the throttling valve device opens to relieve excess pressure. The pressurized hydraulic fluid from the auxiliary energy source is fed from the secondary side to the working side of the master piston to operate the wheel brake actuating cylinders in a dynamic manner during the antiskid control operation. An annular positioning piston is provided which becomes effective only during operation in the antiskid control mode as an abutment for the throttling valve so that the brake pedal is brought into a defined position during the antiskid control operation. A shutoff valve which is controlled in response to the movement of the positioning piston is interposed in the return conduit and prevents escape of hydraulic fluid from the master cylinder device when the hydraulic pump is out of operation.

17 Claims, 1 Drawing Figure

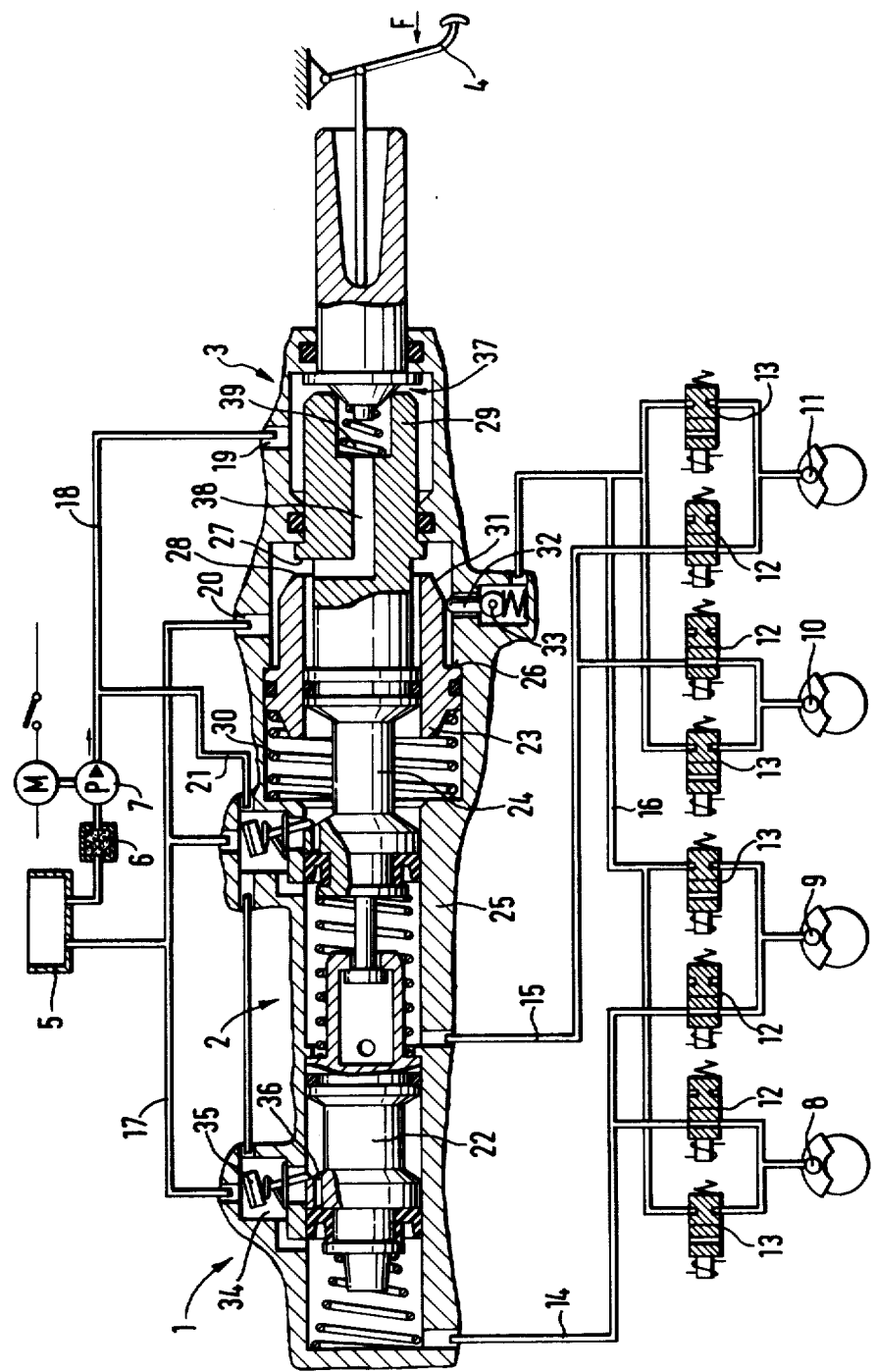

PRESSURE CONTROL ARRANGEMENT FOR VEHICLE BRAKING SYSTEM WITH ANTISKID CONTROL EQUIPMENT

BACKGROUND OF THE INVENTION

The present invention relates to arrangements for controlling the pressure of hydraulic braking fluid supplied to wheel brake actuating cylinder incorporated in a vehicle braking system in general, and more particularly to control arrangements of this type which can be used in vehicle braking systems provided with antiskid control equipment.

There are already known various constructions of arrangements for controlling the pressure supplied to the wheel brake actuating cylinders incorporated in vehicle braking systems, among them such which are particularly or exclusively suited for use in vehicle braking systems provided with antiskid control equipment and with an auxiliary source of pressurized hydraulic fluid, as well as with a brake pedal actuated master cylinder device. It is also known to provide the master cylinder device, which includes at least one master piston circumferentially sealed by a lip seal, with at least one associated replenishment chamber and with a feeding port, and to arrange a throttling valve device which is incorporated in a circulating circuit between the master piston and the brake pedal. The antiskid hydraulic braking system usually includes electromagnetically operatable control valves in the supply conduit between the working chamber of the master cylinder device and the associated wheel brake actuating cylinders. The hydraulic fluid discharged from the respective wheel brake actuating cylinders during the antiskid control operation flows through a return conduit to a low-pressure supply reservoir. In conventional constructions of this type, there is further provided an auxiliary energy source including a hydraulic pump drawing fluid from the low-pressure supply reservoir, there being provided a hydraulic connection between the inlet of the circulating conduit to the throttling valve device and the replenishment chamber associated with the master piston.

In one conventional construction of this type, which has been disclosed in the published German application DE-OS 24 43 545, the circulating conduit, which leads from the low-pressure supply reservoir through the hydraulic pump to the replenishment chamber associated with the master piston and from there to the secondary side of the master piston, includes a longitudinal bore in the piston rod of the master piston and leads from this longitudinal bore to the throttling valve device having a radial outlet which is connected with the supply reservoir so as to close the circuit. The throttling valve device includes an inner throttling valve member which cooperates with associate portions of the free end of the piston rod of the master piston to control the flow of the hydraulic fluid in the circulating circuit. A compression spring which is arranged between the piston rod of the master piston and the throttling valve member holds the end of the piston rod of the master piston which is closer to the brake pedal at a distance from the throttling valve member, so that flow through the throttling valve device is unobstructed and the continuously operated hydraulic pump causes the hydraulic fluid to idly circulate in the circulating circuit, so long as the brake pedal is not depressed. On the other hand, once the brake pedal is depressed, the throttling valve member engages the corresponding regions of the free end of the piston rod of the master piston, so that the throttling valve device closes and interrupts the flow of the hydraulic fluid in the circulating circuit, thus terminating the idle mode of operation of the hydraulic pump. As a result of the closing of the throttling valve device, the pressure at the secondary side of the master piston rises and causes the continuously delivered hydraulic fluid to flow from the secondary side of the master piston through the supply bores provided in the latter into the working compartment of the master cylinder device, from where it flows through the supply conduits into the wheel brake actuating cylinders while dynamically controlling the operation thereof. The master piston of the master cylinder device remains stationary during such operation. The normal function of the master cylinder device with a static control of the operation of the wheel brake actuating cylinders occurs only when the auxiliary energy supply system fails and, consequently, the operation of the wheel brake actuating cylinders cannot be dyanmically controlled any longer.

This conventional construction is possessed of several important disadvantages. So, for instance, this conventional construction consumes a relatively high amount of energy because of the continuous operation of the hydraulic pump. Another drawback is that it is impossible to test the sealing effect of the annular lip seal of the master piston in the direction from the working compartment to the secondary side of the master piston even during the normal operation of the braking circuit without antiskid control action. This may have very grave consequences, since the annular lip seal may become defective first but the existence of the defect is not recognized so long as the auxiliary energy source is operational so that, should the auxiliary energy source subsequently become inoperative, it is impossible to perform emergency braking operation with static control of the pressure supplied to the wheel brake actuating cylinders, due to the defect of the annular lip seal of the master piston and the resulting impossibility to build up static pressure in the working compartment of the master cylinder device.

SUMMARY OF THE INVENTION

Accordingly, it is a general object of the present invention to avoid the disadvantages of the prior art.

More particularly, it is an object of the invention to provide an arrangement for controlling the pressure of the hydraulic supplied to the wheel brake actuating cylinders of a vehicle braking system, which is not possessed of the disadvantages of the conventional controlling arrangements of this type.

Still another objects of the present invention is to develop a controlling arrangement of the type here under consideration which is suited for use in a braking system provided with antiskid control equipment and with an auxiliary source of pressurized hydraulic fluid, which requires only a minimum amount of auxiliary energy for its operation.

It is a further object of the present invention to so construct the controlling arrangement of this type as to be able to detect the loss of sealing effect of a lip seal of a master piston of a master cylinder device while the auxiliary source is operational. A concomitant object of the present invention is to so design the controlling arrangement as to be simple in construction, inexpensive to manufacture and reliable in operation nevertheless.

In pursuance of these objects and others which will become apparent hereafter, one feature of the present invention resides in an arrangement for controlling the pressure of a hydraulic braking fluid supplied to wheel brake actuating cylinders interposed between supply and return conduits of a vehicle braking system provided with antiskid control equipment and with a supply reservoir in dependence on the position of a brake pedal, this controlling arrangement comprising a master cylinder device including a housing defining an elongated bore, and at least one master piston received in the bore for longitudinal movement in and opposite to a working direction and delimiting a working compartment for the hydraulic braking fluid that communicates with at least one of the supply conduits; means for transmitting the brake pedal force to the master piston to move the same in the working direction and thus to pressurize the hydraulic braking fluid present in the working compartment; an auxiliary source of a pressurized hydraulic braking fluid; means for admitting the pressurized hydraulic braking fluid from the auxiliary source into the working compartment only during antiskid control operation of the antiskid control equipment, including an admitting conduit; and means for controlling the pressure in the admitting conduit, including a relief conduit extending from the admitting conduit to the supply reservoir, and a throttling valve interposed in the relief conduit and operative for permitting flow through the relief conduit only after the pressure in the admitting conduit has exceeded a value having a predetermined ratio to the brake pedal force. Advantageously, the throttling valve is interposed between the master piston and the brake pedal to constitute at least a part of the transmitting means and includes a first part connected to the brake pedal for movement therewith and a second part situated between the master piston and the third part and movable toward and away from the first part, and then the controlling means further includes means for so applying the pressure of the hydraulic fluid from the auxiliary source to the first and second parts of the throttling valve as to urge the same apart. A particularly advantageous construction is obtained when the auxiliary source includes a hydraulic pump, and when the admitting means includes means for operating the hydraulic pump only during the antiskid control operation. It is further advantageous when an additional relief conduit is provided which extends between the admitting means and the supply reservoir, and when an additional valve is interposed in the additional relief conduit.

The above construction has several advantages. So, for instance, as a result of the discontinuous or intermittent operation of the hydraulic pump which is operated only during the antiskid control operation, there is obtained relatively low energy consumption. Furthermore, the braking system operates safely not only during the normal operational mode without antiskid control action and in antiskid control mode, but also in an emergency braking mode, inasmuch as the wear-prone annular lip seal of the master piston is being continuously tested during the operation in the normal operating mode for its sealing effect. The braking system is operated in the same manner as any conventional braking system incorporating a master cylinder device, so long as there is no need for the antiskid control action, in that the hydraulic pump is not being operated in the throttling valve device is closed. During operation in the antiskid control mode, the hydraulic pump is being operated and pumps pressurized hydraulic fluid into the throttling valve device while the throttling valve member is in its closed position until the dynamic pressure generated by the hydraulic pump is equal to the static pressure than prevailing in the working compartment of the master cylinder device. As soon as the dynamic pressure reaches the level of the static pressure after the initial running-in period of operation of the hydraulic pump, the excessive pressure delivered by the hydraulic pump is relieved through the then open throttling valve device, so that the braking pressure is not increased during the antiskid control operation until and unless the brake pedal force is increased. Thus, it is achieved by resorting to the use of the throttling valve device according to the present invention that the dynamic pressure during the operation in the antiskid control mode is approximiately the same as the static pressure prevailing in the working compartment of the master cylinder device in dependence on the depression of the brake pedal in the absence of the antiskid control action and the pressure prevailing at the secondary side of the master piston is permitted to propagate to the working compartment of the master cylinder device while the volume confined in the working compartment is replenished from the secondary side. Thus, the operation of the wheel brake actuating cylinders is controlled through the supply conduits in a static as well as in a dynamic manner.

In an advantageous further development of the basic concept of the present invention, the master piston and the throttling valve form a unit, and a shutoff valve is interposed in the return conduit and is so arranged so as to be actuated by the aforementioned unit in dependence on the movement of such unit.

According to further advantageous facet of the present invention, the second part of the throttling valve is also received in the aforementioned bore and has opposite end faces one of which faces toward the first part the other of which delimits a compensating compartment in the bore, the second part further having a passage extending from the one end face into the compensating compartment and constituting a part of the relief conduit, while the return conduit passes through the compensating compartment to merge with the relief conduit thereat. A particularly advantageous construction embodying this concept is obtained when the housing includes a radial bore, when the aforementioned unit further includes a positioning piston received in the bore for longitudinal displacement relative to the housing and to the master piston between two terminal positions in one of which it is closer to the brake pedal than in the other, and when the shutoff valve includes a valve member having a stem passing through the radial bore into the path of movement of the positioning piston to be engaged thereby and to diplace the valve member of the shutoff valve into its open position when the positioning piston is in the one terminal position thereof.

The shutoff is advantageously constructed as a ball valve or as a plunger valve. However, an electromagnetically actuatable shutoff valve may be used instead. The provision of the shutoff valve assures that no quantity of the hydraulic fluid can escape from the working compartment to the low-pressure supply reservoir during the emergency braking operation which is performed after the auxiliary source has failed.

In a particularly advantageous further development of the present invention, the master piston has an extension which extends toward the brake pedal, and the positioning piston has an annular configuration and sealingly surrounds the extension and contacts the housing to delimit the compensating compartment at its other end. In this construction, the housing has an axial abutment in the bore, and a compression spring is provided which urges the positioning piston toward engagement with the axial abutment. Furthermore, the second part of the throttling valve has an external circumferential projection which is engageable with the positioning piston upon application of the brake pedal force to the second part to define a predetermined position for the master piston during the antiskid control operation. It is especially advantageous when the second part of the throttling valve is integral with the extension of the master piston. The compression spring is preferably arranged at that side of positioning piston which faces away from the brake pedal to urge the positioning piston toward the latter. As a result of this construction, the brake pedal can be depressed only to a predetermined position when pressurized hydraulic fluid from the auxiliary source is available. This means that a corresponding reserve volume of the hydraulic fluid is preserved in the master cylinder device at the region of the working compartment and any further control of the pressure supply to the wheel brake actuating cylinder occurs exclusively in a dynamic manner.

To implement the operation of the shutoff valve, the positioning piston is advantageously provided with a ramp surface at that of its ends which is closer to the brake pedal, the ramp surface being inclined inwardly as considered in the direction toward the brake pedal and being engageable with stem of the valve member of the shutoff valve.

When the control arrangement of the present invention is being used in a braking system in which the brake conduit includes individual branch conduits connected to the wheel brake actuating cylinder and merging into a common return conduit section, the shutoff valve is advantageously interposed in the common return conduit section.

According to a further advantageous aspect of the present invention, the admitting means includes a replenishment chamber associated with the master piston. There is further provided an additional relief conduit which leads from the replenishment chamber to the supply reservoir, and a relief valve which is so operated in dependence on the movement on the master piston as to open the additional conduit to the flow of the hydraulic fluid from the replenishment chamber to the supply reservoir only when the master piston is substantially is in its rest position corresponding to the absence of braking action. A particularly simple and otherwise advantageous construction is obtained when the relief valve is a spring-loaded tilting valve accommodated in the replenishment chamber.

The controlling arrangement of the present invention may also be used in a hydraulic braking system which has two braking circuits each of which includes a separate supply conduit and a separate return conduit and at least one of the wheel brake actuating cylinders interposed therebetween, in which case the master cylinder device advantageously further includes an additional master piston received in the bore in tandem with the one master piston and delimiting an additional working compartment, each of the working compartments communicating with one of the supply conduits. Under these circumstances, the admitting conduit is also operative for admitting the pressurized hydraulic fluid into the additional working compartments and includes two branches each leading to one of the working compartments. Furthermore, there are provided two additional relief conduits each of which leads from one of the admitting conduit branches to the supply reservoir, and two relief valves each of which controls the flow of the hydraulic fluid into one of the branches in dependence on the position of the associated one of the master pistons.

BRIEF DESCRIPTION OF THE DRAWINGS

Above-mentioned and other features and objects of this invention will become more apparent by reference to the following description taken in conjunction with the accompanying sole FIGURE of the drawing which is a partly sectioned and partly diagramatic view of the controlling arrangement according to the present invention as incorporated in a hydraulic braking system of a vehicle.

DETAILED DESCRIPTION OF THE PREFERRED EMBODIMENT

Referring now to the drawing in detail, it may be seen that reference numeral 1 has been used to identify an arrangement for controlling the effective braking pressure in a hydraulic braking system of a vehicle in its entirety. The controlling arrangement 1 includes a master cylinder device 2 and a throttling valve device 3 which is arranged between the master cylinder device 2 and a brake pedal 4. The brake pedal 4 is capable of exerting brake pedal force F on the throttling valve device 3 to displace the same in the leftward direction as considered in the drawing. The master cylinder device 2 as illustrated in the drawing is constructed as a tandem master cylinder accommodating two master pistons 22. A low-pressure hydraulic supply reservoir 5 is provided and contains a supply of hydraulic fluid which can be withdrawn therefrom during the operation of the controlling arrangement 1 and the associated braking system. Two replenishment chambers 34 are arranged upstream of the tandem master cylinder 2, these replenishment chambers 34 being connected by respective conduits with the low-pressure supply reservoir 5. Feeding bores 36 are provided in the master piston 22 to provide a connection from the secondary side to the working side of the respective master piston 22. The master pistons 22 are provided with respective annular deflectable seals which act as one-way valves so that the hydraulic fluid can flow past the same and through the feeding bores 36 from the secondary side to the working side of the respective master piston 22, but not in the opposite direction.

Each of the master pistons 22 delimits at its working side a respective working compartment which is connected, through a respective braking or supply conduit 14 or 15, with associated wheel brake actuating cylinders 8 and 9, or 10 and 11, the wheel brake actuating cylinders 8 and 9 being associated with vehicle wheels which are disposed diagonally relative to one another as far as the vehicle is concerned, while the remaining wheel brake actuating cylinders 10 and 11 are associated with the remaining diagonally disposed vehicle wheels. Electromagnetically actuatable normally open two-port two-position valves 12 are interposed in the respective supply conduits 14 and 15, these valves 12 being operated by an electronic antiskid control unit of a conventional construction which has been omitted from the drawing in order not to unduly encumber the same when it is determined that impermissibly high slip values exist between the vehicle tires and the roadway.

All wheel brake actuating cylinders 8, 9, 10 and 11 are connected at their outlets with a return conduit 16 which leads to the low-pressure supply reservoir 5. The return conduit 16 passes through the unit constituted by the master cylinder device 2 and the throttling device 3.

Electromagnetically actuatable normally closed two-port two-position valves 13 are interposed in the return conduit 16. These valves 13 are also operated by the electronic antiskid control unit, also in a conventional manner, when the pressure in at least one of the wheel brake actuating cylinders 8, 9, 10 or 11 is to be reduced in order to avoid excessive slippage between the associated wheel and the roadway.

The throttling valve device 3 which is arranged between the tandem master cylinder 2 and the brake pedal 4 generally consists of a first part constituted by a throttling valve member 37 and a second part 29 of a socket-shaped configuration which is illustrated as being integral with the piston rod 24 of that of the pistons 22 which is closer to the brake pedal 4. The throttling valve member 37 is mechanically connected to the brake pedal 4. The second part 29 is provided with an inner passage 38 which connects the working side of the second part 29 which is closer to the brake pedal 4 with a compensating compartment situated at the other or compensating side of the second part 29 when the throttling valve device 3 is opened. The throttling valve device 3 is normally closed and communication therethrough is established only under certain operating conditions, as will be explained later. The return conduit 16 from the wheel brake actuating cylinders 8 to 11 also passes through the compensating compartment on its way toward the supply reservoir 5.

The inner passage 38 is enlarged at the region of cooperation with the throttling valve member 37. A compression spring 39 is received in the enlarged section of the inner passage 38 and urges the throttling valve member 37 and the socket-shaped second part 29 apart. In its open position, the throttling valve device 3 establishes communication through a circulating circuit 18 which leads from the low-pressure supply reservoir 5 to a throttling valve inlet 19, from there through the inner passage 38 into the compensating compartment and to a throttling valve outlet 20, and then back to the low-pressure hydraulic fluid supply reservoir 5. A filter unit 6 and a hydraulic pump 7 are interposed downstream from one another in the circulating conduit 18 between the low-pressure supply reservoir 5 and the throttling valve inlet 19. The hydraulic pump 7 is operated during braking in antiskid control mode.

The circulating conduit 18 is provided between the hydraulic pump 7 and the throttling valve input 19 with a branch in the form of a hydraulic conduit 21 which leads to the two replenishment chambers 34 associated with the respective master piston 22.

The replenishment chambers 34 are further connected, through a relief conduit 17, with the low-pressure supply reservoir 5. A spring-loaded tilting valve 35 is accommodated in each of the replenishment chambers 34. The respective tilting valve 35 is so mechanically actuated by the associated master piston 22 that, in the absence of actuation of the brake pedal, the relief conduit 17 to the low-pressure supply reservoir 5 is unobstructed, while communication between the replenishment chamber 34 and the relief conduit 17 is interrupted in each other position of the respective master piston 22.

An annular positioning piston 23 is situated at the secondary side of that master piston 22 which is closer to the brake pedal 4. The positioning piston 23 sealingly surrounds the enlarged end portion of the piston rod 24 in a coaxial manner, such that the piston rod 24 is axially movable relative to the positioning piston 23.

The positioning piston 23 is sealingly received in an enlarged section of the bore of the master cylinder housing 25 for axial movement in such section with respect to the master cylinder housing 25. An axial abutment 26 is provided which is rigid with the master cylinder housing 25. A compression spring 30 urges the positioning piston 23 toward engagement with the axial abutment 26. The compression spring 30 rests at its end remote from the positioning piston 23 on a corresponding circumferential edge portion of the master cylinder housing 25. The compression spring 30 is so dimensioned as to subject the positioning piston 23 to a force which is directed against the pedal force F and which has such a magnitude as to just overcome the frictional force of the sealing material.

The second part 29 of the throttling valve device 3 is provided, at the region of the compensating compartment, with a circumferential projection 27 which can be brought into engagement with a circumferential edge portion 28 of the positioning piston 23 upon depression of the brake pedal 4.

The function of the circumferential projection 27 in cooperation with the positioning piston 23 will be explained in some detail later on.

The positioning piston 23 is further provided, at the region of the circumferential edge portion 28, with a conical end portion which converges in direction toward the brake pedal 4, this conical end portion being circumferentially delimited by an inclined ramp surface 31. The ramp surface 31 cooperates with a valve stem 32 of a return valve 33 which is interposed in the return conduit 16. The valve stem 32 extends radially through a corresponding bore of the master cylinder housing 25 and a spring is provided which urges the valve stem 32 in the radially inward direction. The return or shutoff valve 33 is so arranged that the valve stem 32 engages the ramp surface 31 when the positioning piston 23 is in contact with or close to the axial abutment 26. In this engaged position of the valve stem 32, the shutoff valve 33 is open and permits flow of hydraulic fluid through the return conduit 16 to the compensating compartment and eventually to the low-pressure supply reservoir 5.

When the positioning piston 23 is in its leftward position as considered in the drawing, the ramp surface 31 and the valve stem.

When the brake pedal 4 is not depressed, that is, when the magnitude of the brake force F is zero, the throttling valve device 3 is closed due to the forces exerted on the master pistons 22 by their respective return springs against the force of the compression spring 39 and, consequently, the communication through the hydraulic circulating conduit 18 is interrupted. Under these circumstances, the hydraulic pump 7 is not being operated. During normal braking operation, that is, without antiskid control action, the braking system operates in the same way as conventional braking systems incorporating a master cylinder device, that is, the brake force F is transmitted to the master pistons 22 which, in turn, pressurize the hydraulic fluid present in the respective working compartments, this pressurized hydraulic fluid being supplied through the supply conduits 14 and 15 and through the normally open control valves 12 to the respective wheel brake actuating cylinders 8 to 11. This operation is referred throughout the specification as static operation.

On the other hand, once a need for performing an antiskid control operation is detected, a motor M of hydraulic pump 7 is energized, so that the hydraulic pump commences to discharge pressurized hydraulic braking fluid into the conduits 18 and 21.

Thus, the hydraulic pump 7 constitutes an auxiliary energy source or auxiliary source of pressurized hydraulic braking fluid during the operation in the antiskid control mode. The throttling valve device 3 is closed and pressure in the conduit 18 in the working compartment of the throttling valve device 3 gradually rises after the commencement of operation of the hydraulic pump 7 until it reaches a level at which the effect of this pressure on the throttling valve parts 27 and 29, together with the force of the compression spring 39 exceeds the forces urging the valve parts 37 and 29 toward one another, that is, the brake force F in the working direction and the effect of the static pressure in the working compartments of the master cylinder device on the master piston 22 which is closer to the brake pedal 4 in the opposite direction. When this occurs, the throttling valve parts 37 and 29 move apart and the excess of pressure in the working compartment of the throttling valve device 3 is relieved into the compensating compartment through the inner passage 38 of the second part 29 of the throttling valve device 3. In this manner, the pressure in the conduit 18 and hence in the conduit 21 and in the replenishment chambers 34 is maintained at a level substantially corresponding to that of the static pressure prevailing in the working compartments of the master cylinder device 2. During the process of opening the throttling valve device 3, the master piston 22 which is connected with the second part 29 of the throttling valve device 3 is displaced to a minute extent in the rightward direction as considered in the drawing and, simultaneously therewith, a quantity of the pressurized hydraulic fluid from the respective replenishment chamber 34 and from the secondary side of the respective master piston 22 is permitted to flow past the annular deflectable seal into the associated working compartment of the master cylinder device 2, that is, the amount of the pressurized hydraulic fluid in the respective working compartment is replenished. This means that the pressurized hydraulic fluid from the auxiliary source is gradually admitted into the respective working compartment of the master cylinder device 2 and through the same into the supply conduits 14 and 15 to flow through the latter to the respective wheel brake actuating cylinders 8 to 11 and, consequently, the operation of such wheel brake actuating cylinders is performed in a dynamic manner.

As a result of the supply of the dynamic pressure from the auxiliary source into the braking system during the antiskid control operation, and particularly because of the admission of the pressurized hydraulic fluid through the hydraulic conduit 21 to the secondary side of the master piston 22 which is closer to the brake pedal 4, the positioning piston 23 is displaced toward and into engagement with the axial abutment 26 and is arrested in this terminal position thereof. Consequently, should the brake pedal 4 be depressed to such an extent that the circumferential projection 27 of the second part 29 of the throttling valve device 3 engages the associated circumferential edge portion 28 of the positioning piston 23, the positioning piston 23 acts on the circumferential projection 28 wih a force opposing the brake force F to hold the brake pedal 4 in this engaged position. In this manner, an excessive depression of the brake pedal 4 which would result in excessive depletion of the hydraulic fluid present in the working compartments of the master cylinder 2 is prevented. In this position of the positioning piston 23, the valve 33 is open so that the hydraulic fluid discharged from the wheel brake actuating cylinders 8 to 11 during the antiskid control operation can flow into the compensating compartment and from the into the supply reservoir 5.

Should the supply of pressurized hydraulic fluid from the auxiliary energy source fail, or should or one or both of the braking circuits become defective, it is still possible to operate the braking system in a purely mechanical manner. When the supply of the pressurized hydraulic fluid from the auxiliary energy source ceases, the pressure on the side of the positioning piston 23 which faces away from the brake pedal 4 drops and, consequently, it is possible to displace the positioning piston 23 out of its arresting position in the leftward direction as seen in the drawing, possibly by applying a higher brake force F to the brake pedal 4. At the same time, the valve 33 is closed so that it is assured that no quantity of the hydraulic fluid can escape through the return conduit 16 to the low-pressure supply reservoir 5 upon brake pedal depression during such emergency braking operation. In this manner, the vehicle braking system is kept fully operational even when the auxiliary energy source or one of the braking circuits becomes defective. Furthermore, since the hydraulic pump 7 does not operate during normal braking operation without antiskid control action, any leaks past the master pistons 22 would be detected during the normal braking operation while the auxiliary energy source is still operational, and corrective measures can be taken so as to assure that emergency braking can be accomplished should the auxiliary energy source fail.

Consequently, the present invention presents an antiskid control arrangement of a hydraulic vehicle braking system, which includes a master cylinder device and a throttling valve device arranged between the master cylinder device and the brake pedal and incorporated in a circulating circuit. The circulating circuit includes a hydraulic pump which is operated exclusively during antiskid control operation. During normal braking operation without antiskid control action, the braking system operates in the same manner as any conventional braking system including a master cylinder device, so that the wheel brake actuating cylinders are operated in a static manner, the hydraulic pump is inoperative, and the throttling valve is closed. On the other hand, during antiskid control braking operation, the drive of the hydraulic pump is energized while the throttling valve device is closed and this situation persists until the dynamic pressure generated by the hydraulic pump has risen to the level to the static pressure then prevailing in the working compartments of the master cylinder device. When the dynamic pressure delivered by the hydraulic pump exceeds the static master cylinder pressure, the pressure differential is reduced or eliminated by the throttling valve device which is then open. The pressurized hydraulic fluid from the auxiliary energy source is fed from the secondary side to the working side of the master piston and, as a consequence thereof, the wheel brake actuating cylinders are operated via the brake conduits in a static as well as in a dynamic manner during the antiskid control operation. An annular positioning piston is provided which becomes effective only during operation in the antiskid control mode, when the hydraulic pump pumps the pressurized hydraulic fluid, and an increase in the dynamic pressure above the static pressure in the master cylinder device is prevented by opening the throttling valve device. The positioning piston is acted upon, during the operation in the antiskid control mode, by the pressurized hydraulic fluid supplied by the hydraulic pump and is arrested by this action in its terminal position which is closer to the brake pedal. A suitable region of the positioning piston serves as an abutment for the throttling valve so that the brake pedal is brought into a defined position during the antiskid control operation. In this manner, a safety reserve volume is preserved in the working compartment of the master cylinder device. A shutoff valve which is controlled in response to the movement of the positioning piston toward the above-mentioned terminal position and interposed in the return or relief conduit assures that no hydraulic fluid can escape from the master cylinder device to the low-pressure hydraulic reservoir when the auxiliary source is out of operation and, therefore, that the braking system remains fully operational.

While we have described above the principles of our invention in connection with specific apparatus, it is to be clearly understood that this description is made only by way of example and not as a limitation to the scope of our invention as set forth in the accompanying claims.

We claim:

1. An arrangement for controlling the pressure of a hydraulic braking fluid supplied to wheel brake actuating cylinders interposed between supply and return conduits of a vehicle braking system provided with antiskid control equipment and with a supply reservoir in dependence on the position of a brake pedal, comprising a master cylinder device including a housing defining an elongated bore, and at least one master piston received in said bore for longitudinal movement in and opposite to a working direction and delimiting in said bore a working compartment for the hydraulic braking fluid that communicates with at least one of the supply conduits; means for transmitting the brake pedal force to said master piston to move the same in said working direction and thus to pressurize the hydraulic braking fluid present in said working compartment; an auxiliary source of a pressurized hydraulic braking fluid, means for admitting the pressurized hydraulic braking fluid from said auxiliary source into said working compartment only during antiskid control operation of the antiskid control equipment, including a circulating conduit for pressurized fluid; and means for controlling the pressure in said circulating conduit, and a throttling valve interposed at the output of said circulating conduit and arranged between said brake pedal and said master piston to constitute at least a part of said transmitting means, and said throttling valve responsive to pressurized fluid from said circulating conduit for permitting flow from said circulating conduit only after the pressure in said circulating conduit has exceeded a value having a predetermined ratio to the brake pedal force to provide pressurized fluid from said admitting conduit to said working compartment.

2. The arrangement as defined in claim 1, wherein said throttling valve includes a first part connected to the brake pedal for movement therewith and a second part situated between said master piston and said first part and movable toward and away from the latter; and wherein said controlling means further includes means for so applying the pressure of the hydraulic fluid from said auxiliary source to said first and second parts of said throttling valve as to urge the same apart.

3. The arrangement as defined in claim 1, wherein said auxiliary source includes a hydraulic pump; and wherein said admitting means includes means for operating said hydraulic pump only during the antiskid control operation.

4. The arrangement as defined in claim 1; and further comprising an additional relief conduit extending between said admitting means and the supply reservoir; and an additional valve interposed in said additional relief conduit.

5. The arrangement as defined in claim 1, wherein said master piston and said throttling valve form a unit; and further comprising a shutoff valve interposed in the return conduit and actuatable by said unit in dependence on the movement of said unit.

6. The arrangement as defined in claim 5, wherein said second part is also received in said bore and has opposite end faces one of which faces toward said first part and the other of which delimits a compensating compartment in said bore, and a passage extending from said one end face into said compensating compartment and constituting a part of said relief conduit; and wherein said return conduit passes through said compensating compartment to merge with said relief conduit thereat.

7. The arrangement as defined in claim 6, wherein said housing includes a radial bore; wherein said unit further includes a positioning piston received in said bore for longitudinal displacement relative to said housing and to said master piston between two terminal positions in one of which it is closer to the brake pedal than in the other; and wherein said shutoff valve includes a valve member having a stem passing through said radial bore into the path of movement of said positioning piston to be engaged thereby and to displace said valve member of said shutoff valve into its open position when said positioning piston is in said one terminal position thereof.

8. The arrangement as defined in claim 7, wherein said shutoff valve is a plunger valve.

9. The arrangement as defined in claim 7, wherein said master piston has an extension extending toward the brake pedal; and wherein said positioning piston has an annular configuration and sealingly surrounds said extension and contacts said housing to delimit said compensating compartment at its other end.

10. The arrangement as defined in claim 9, wherein said housing has an axial abutment in said bore; further comprising a compression spring urging said positioning piston toward engagement with said axial abutment; and wherein said second part of said throttling valve has an external circumferential projection which is engageable with said positioning piston upon application of the brake pedal force to said second part to define a predetermined position for said master piston during the antiskid control operation.

11. The arrangement as defined in claim 10, wherein said second part is integral with said extension of said master piston.

12. The arrangement as defined in claim 10, wherein said compression spring is arranged at that side of said positioning piston which faces away from the brake pedal to urge said positioning piston toward the latter.

13. The arrangement as defined in claim 7, wherein said positioning piston has a ramp surface at that end thereof which is closer to the brake pedal, said ramp surface being inclined inwardly as considered in the direction toward the brake pedal and being engageable with said stem of said valve member of said shutoff valve to operate the latter.

14. The arrangement as defined in claim 5, for use in a braking system in which the brake conduit includes individual branch conduits connected to the wheel brake actuating cylinders and merging into a common return conduit section, wherein said shutoff valve is interposed in said common return conduit section.

15. The arrangement as defined in claim 1, wherein said admitting means includes a replenishment chamber; further comprising an additional relief conduit leading from said replenishment chamber to the supply reservoir, and a relief valve so operated in dependence on the movement of said master piston as to open the additional passage to the flow of the hydraulic fluid from said replenishment chamber to the supply reservoir only when said master piston is substantially in its rest position corresponding to the absence of braking action.

16. The arrangement as defined in claim 15, wherein said relief valve is a spring-loaded tilting valve accommodated in said replenishment chamber.

17. The arrangement as defined in claim 1 for use in a hydraulic braking system having two braking circuits each including a separate supply conduit and a separate return conduit and at least one of the wheel brake actuating cylinders interposed therebetween, wherein said master cylinder device further includes an additional master piston received in said bore in tandem with said one master piston and delimiting an additional working compartment, each of said working compartments communicating with one of the supply conduits; wherein said admitting conduit is also operative for admitting the pressurized hydraulic fluid into the additional working compartment and includes two branches each leading to one of said working compartments; and further comprising two additional relief conduits each leading from one of said admitting conduit branches to the supply reservoir, and two relief valves each controlling the flow of the hydraulic fluid through one of said branches in dependence on the position of the associated one of said master pistons

* * * * *